United States Patent
Park et al.

(10) Patent No.: US 10,596,987 B2
(45) Date of Patent: Mar. 24, 2020

(54) APPARATUS FOR CONTROLLING ELECTRIC CURRENT OF VEHICLE AND VEHICLE HAVING THE APPARATUS

(71) Applicants: HYUNDAI MOTOR COMPANY, Seoul (KR); KIA MOTORS CORPORATION, Seoul (KR)

(72) Inventors: ChoongSeob Park, Suwon-si (KR); TaeSun Roh, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 171 days.

(21) Appl. No.: 15/378,439

(22) Filed: Dec. 14, 2016

(65) Prior Publication Data
US 2018/0079378 A1    Mar. 22, 2018

(30) Foreign Application Priority Data
Sep. 21, 2016   (KR) .................. 10-2016-0120873

(51) Int. Cl.
| | |
|---|---|
| *B60R 16/03* | (2006.01) |
| *B60L 1/16* | (2006.01) |
| *G05F 1/575* | (2006.01) |
| *H05B 33/08* | (2020.01) |

(52) U.S. Cl.
CPC ............... *B60R 16/03* (2013.01); *B60L 1/16* (2013.01); *G05F 1/575* (2013.01); *H05B 33/0845* (2013.01)

(58) Field of Classification Search
CPC ..... B60R 16/03; G05F 1/575; H05B 33/0812; H05B 33/0884

USPC .................................................. 315/291–311
See application file for complete search history.

(56) References Cited

U.S. PATENT DOCUMENTS

| | | | | |
|---|---|---|---|---|
| 5,008,586 | A * | 4/1991 | Miyazaki ............... | H03F 1/523 |
| | | | | 323/315 |
| 6,316,967 | B1 * | 11/2001 | Takagi ................. | G01R 19/165 |
| | | | | 327/50 |
| 6,548,916 | B1 * | 4/2003 | Kanazawa ........... | H03K 17/063 |
| | | | | 307/10.1 |
| 6,701,262 | B2 * | 3/2004 | Mizuno ................. | H02H 3/087 |
| | | | | 307/10.1 |
| 7,352,135 | B2 | 4/2008 | Shiotsu et al. | |
| 2012/0235710 | A1 * | 9/2012 | Roessler ............... | H03K 17/567 |
| | | | | 327/109 |
| 2014/0159670 | A1 * | 6/2014 | Lee ........................ | B60L 3/0007 |
| | | | | 320/134 |

(Continued)

FOREIGN PATENT DOCUMENTS

| | | |
|---|---|---|
| CN | 103079320 A | 5/2013 |
| EP | 2639915 A2 | 9/2013 |

(Continued)

*Primary Examiner* — Rexford N Barnie
*Assistant Examiner* — Terrence R Willoughby
(74) *Attorney, Agent, or Firm* — Morgan, Lewis & Bockius LLP

(57) ABSTRACT

An apparatus for controlling electric current includes a power supply for supplying a voltage, a driving circuit for receiving the voltage from the power supply to supply a first current to a load electrically connected thereto, and a control circuit electrically connected to the load and the driving circuit and for receiving the voltage from the power supply to supply a second current to the load.

14 Claims, 9 Drawing Sheets

(56) References Cited

U.S. PATENT DOCUMENTS

2015/0145562 A1* 5/2015 Vermeir ................ H05K 13/00
327/87
2015/0357910 A1* 12/2015 Murakami ......... H05B 33/0815
363/89
2016/0088702 A1 3/2016 Gray et al.

FOREIGN PATENT DOCUMENTS

JP      2004-051014 A    2/2004
JP      2014-216310 A   11/2014
KR   10-2006-0090007    8/2006

* cited by examiner

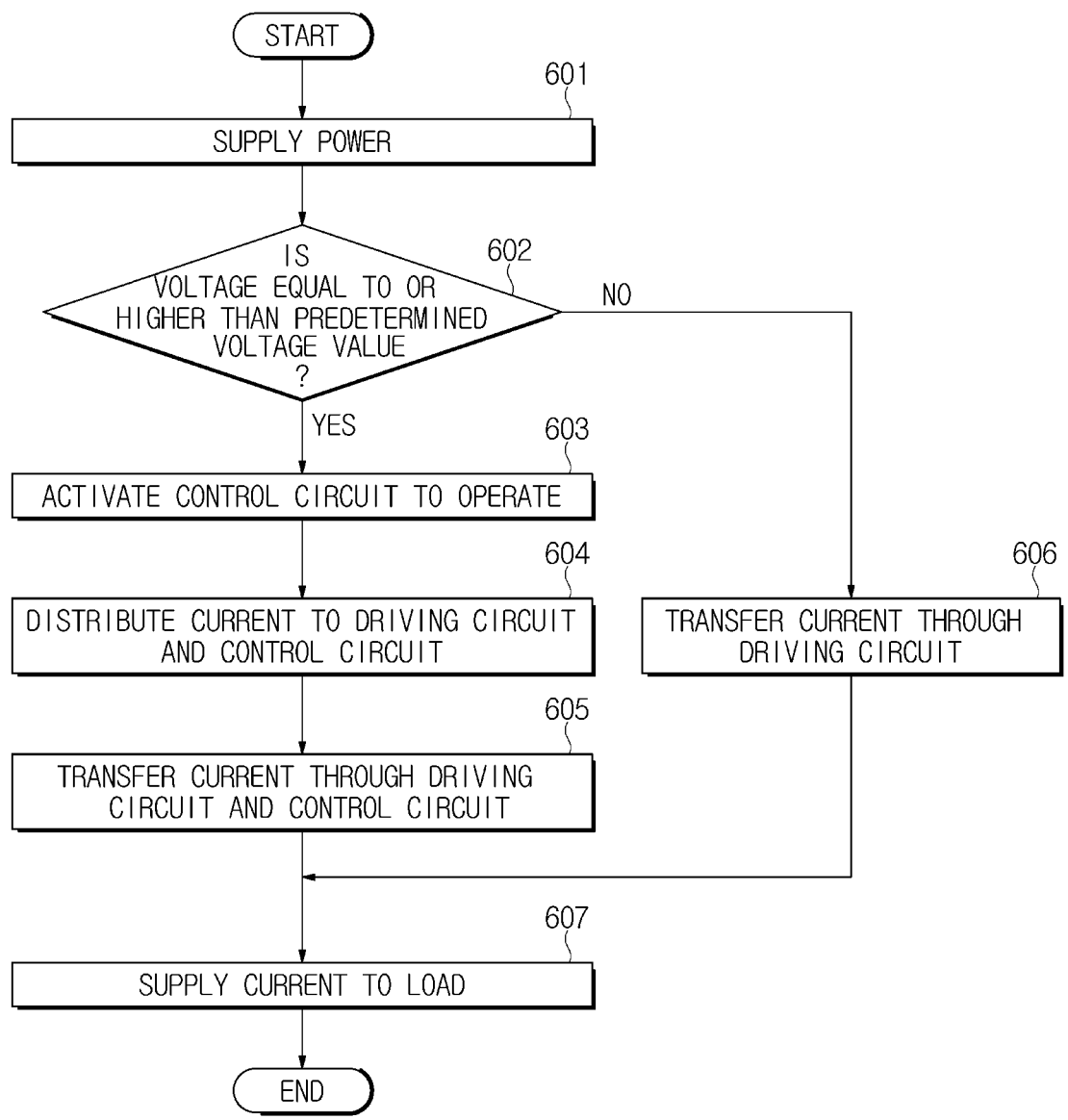

APPARATUS FOR CONTROLLING ELECTRIC CURRENT OF VEHICLE AND VEHICLE HAVING THE APPARATUS

CROSS-REFERENCE TO RELATED APPLICATION

This application claims the benefit of priority to Korean Patent Application No. 10-2016-0120873, filed on Sep. 21, 2016 with the Korean Intellectual Property Office, the disclosure of which is incorporated herein by reference.

TECHNICAL FIELD

Embodiments of the present disclosure relate to an apparatus for controlling electric current of a vehicle and a vehicle having the apparatus, and more particularly to an apparatus for controlling electric current of a vehicle capable of controlling a supply current regardless of a voltage level being applied and a vehicle having the same.

BACKGROUND

Methods of controlling the load of a light emitting diode (LED) are generally classified into three types of methods, including resistance methods, linear control methods and switching control methods. Of the three, linear control methods and switching control methods are methods of supplying a constant current.

A switching control method is capable of maintaining a constant brightness regardless of voltage fluctuation and is flexible regarding design changes to deal with a quantity and current change of an LED. However, switching control methods include features of a complicated circuit, a high design cost and weak characteristics in response to electromagnetic waves.

A linear control method is capable of maintaining the load 100 of an LED at a constant brightness in spite of voltage fluctuation, is excellent in terms of power stability and reliability and has a simple circuit structure. However, linear control methods are disadvantageous in that a current that can be supplied for each LED package is fixed and a sufficient area of a printed circuit board (PCB) is required due to large amount of heat generation.

Therefore, a need for a control apparatus capable of resolving the heat generation problem and stably supplying a current is unmet.

SUMMARY

Therefore, it is an aspect of the present disclosure to provide an apparatus for controlling electric current of a vehicle capable of supplying a constant current to a load by connecting a control circuit to a driving circuit without using an additional circuit, and thereby reducing cost and simplifying a circuit configuration, and to provide a vehicle having the same.

In accordance with one aspect of the present disclosure, an apparatus for controlling electric current includes: a power supply configured to supply a voltage; a driving circuit configured to receive the voltage from the power supply to supply a first current to a load electrically connected thereto; and a control circuit electrically connected to the load and the driving circuit and configured to receive the voltage from the power supply to supply a second current to the load.

The control circuit may operate as an open circuit when a voltage less than a preset value is applied.

The control circuit may supply the second current to the load based on a difference between a preset reference current and the first current when a voltage equal to or higher than a preset value is applied.

The control circuit may include at least one transistor and at least one resistance element.

The control circuit may include at least one metal-oxide semiconductor field-effect-transistor (MOSFET) and at least one resistance element.

The control circuit may include a resistance element individually connected in series to a drain and a source of a MOSFET.

The driving circuit may supply the first current to the load based on a difference between a preset reference current and the second current when a voltage equal to or higher than a preset value is applied.

The driving circuit may supply the first current having a preset reference current value to the load when a voltage less than a preset value is applied.

The driving circuit may include at least one logic gate and at least one Zener diode.

The driving circuit may include the Zener diode electrically connected to a gate and the source of the MOSFET and the logic gate connected to the Zener diode in series.

In accordance with another aspect of the present disclosure, a vehicle includes: a power supply configured to supply a voltage; a driving circuit configured to receive the voltage from the power supply to supply a first current to a load electrically connected thereto; and a control circuit electrically connected to the load, electrically connected to the driving circuit and configured to receive the voltage from the power supply to supply a second current to the load.

The control circuit may operate as an open circuit when a voltage less than a preset value is applied.

The control circuit may supply the second current to the load based on a difference between a preset reference current and the first current when a voltage equal to or higher than a preset value is applied.

The control circuit may include at least one transistor and at least one resistance element.

The control circuit includes at least one MOSFET and at least one resistance element.

The control circuit may include a resistance element individually connected in series to a drain and a source of the MOSFET.

The driving circuit may supply the first current to the load based on a difference between a preset current and the second current when a voltage equal to or higher than a preset value is applied.

The driving circuit may supply the first current having a preset current value to the load when a voltage less than a preset value is applied.

The driving circuit may include at least one logic gate and at least one Zener diode.

The driving circuit may include the Zener diode electrically connected to a gate and the source of the MOSFET and the logic gate connected to the Zener diode in series.

In accordance with still another aspect of the present disclosure, a system for controlling electric current includes: a load; a power supply configured to supply a voltage; a driving circuit configured to receive the voltage from the power supply to supply a first current to the load electrically connected thereto; and a control circuit electrically connected to the load, electrically connected to the driving circuit and configured to receive the voltage from the power supply to supply a second current to the load.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 9 is a flowchart according to exemplary embodiments of the present disclosure.

DETAILED DESCRIPTION

Figure 1:
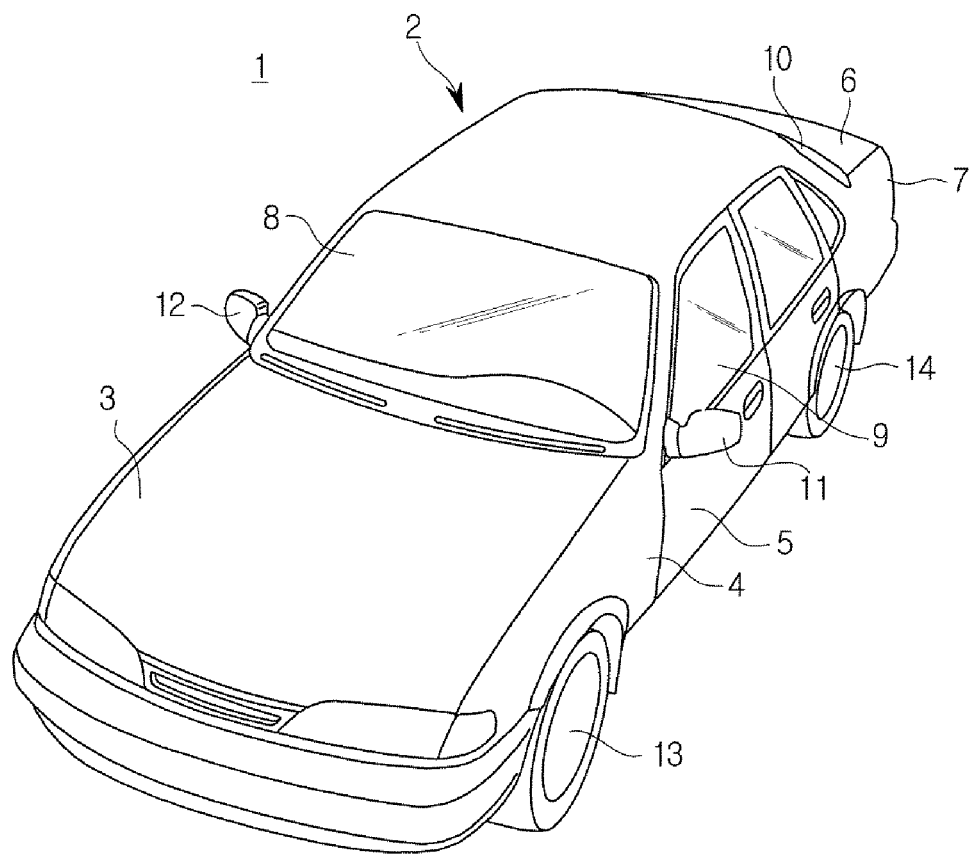
FIG. 1 is an external view of a vehicle according to exemplary embodiments of the present disclosure.

The same reference numerals indicate the same components throughout the specification. The specification does not describe all components of embodiments, and generally known information in the art to which the present disclosure belongs and duplicated descriptions between embodiments will be omitted. The terms "unit," "module," "member," and/or "block," may be implemented by software or hardware, and depending on embodiments, a plurality of "units," "modules," "members," and/or "blocks," may be implemented as a single component, or a single "unit," "module," "member," or "block" may include a plurality of components.

Throughout the specification, when a portion is referred to as being "connected" to another portion, it may include not only the case of being directly connected but also the case of being indirectly connected, and the indirect connection may include connection via a wireless communication network.

In addition, when a portion is referred to as "comprising" or "including" another component, it should be interpreted as that one or more other components may further be added and should not be interpreted as excluding other components unless specifically otherwise described.

Throughout the specification, when a member is referred to as being positioned "on" another member, the member can be "directly on" the other member or there may be an intervening member therebetween.

The terms "first," "second," etc. are only used to distinguish one component from another, and the components should not be limited by these terms.

Singular expressions are intended to include the plural expressions as well, unless the context clearly indicates otherwise.

Although identification codes may be used at each step for convenience of explanation, the identification codes are not intended to describe the order or sequence of the steps, and each of the steps may be differently implemented than in the order stated, unless the context clearly states a particular order.

Hereinafter, principles and embodiments of the present disclosure will be described in detail with reference to accompanying drawings.

FIG. 1 is an external view of a vehicle according to exemplary embodiments of the present disclosure.

Referring to FIG. 1, a vehicle 1 includes a vehicle body 2 which forms an exterior of the vehicle 1, and wheels 13 and 14 which move the vehicle 1. The vehicle body 2 includes a hood 3, a front fender 4, a door 5, a trunk lid 6, a quarter panel 7 and the like.

In addition, an outer side of the vehicle body 2 may be provided with a front window 8 installed at a front side of the vehicle body 2 to provide a front view from the vehicle 1, a side window 9 which provides a side view, side mirrors 11 and 12 installed at the doors 5 to provide rear and side views from the vehicle 1, and a rear window 10 installed at a rear side of the vehicle body 2 to provide a rear view from the vehicle 1.

The wheels 13 and 14 include front wheels 13 provided at the front side of the vehicle and rear wheels 14 provided at the rear side of the vehicle, and a driving mechanism (not shown) provides a rotating force to the front wheels 13 and/or rear wheels 14 so that the vehicle 1 moves forward or rearward. The above-described driving mechanism may employ an engine which burns fossil fuels to generate a rotating force or a motor which receives power from a condenser, or battery, to generate a rotating force.

Figure 2:
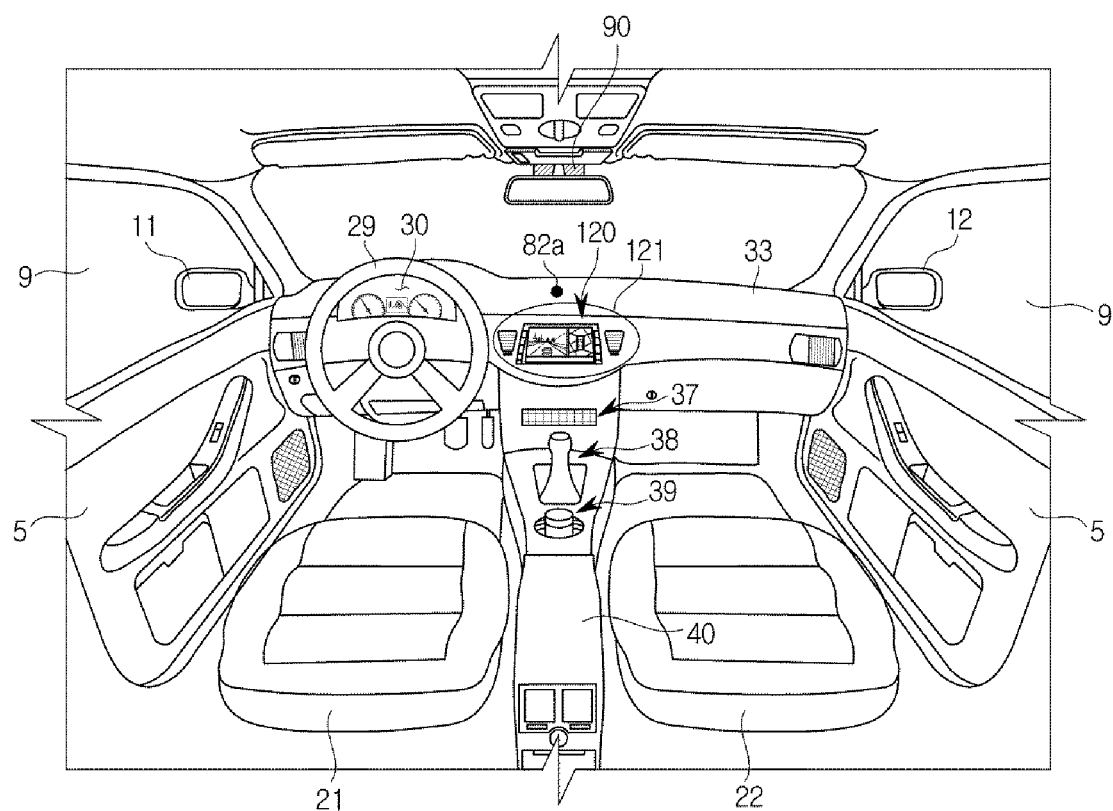
FIG. 2 is a view of a vehicle interior according to exemplary embodiments of the present disclosure.

FIG. 2 is a view of a vehicle interior according to exemplary embodiments of the present disclosure.

Referring to FIG. 2, the interior of the vehicle 1 includes seats 20 on which passengers sit, a dashboard 33, an instrument panel (that is, a cluster 30) disposed on the dashboard and including a tachometer, a speedometer, a temperature indicator, a fuel indicator, a turn signal indicator, a high beam indicator light, warning lights, a seat-belt warning light, a trip odometer, an odometer, an automatic transmission shift lever indicator, a door open warning light, an oil warning light, a low fuel warning light and the like disposed thereon, a steering wheel 31 by which a vehicle direction is manipulated, and a center fascia 35 at which a vent and control panel of an air conditioner and an audio device are disposed.

Meanwhile, a center console 37 may be provided with a center input in a jog shutter type or a hard key type. The center console 37 is positioned between a driver seat 21 and a front passenger seat 22 and refers to a portion in which a gear shift lever 38 and a tray 40 are formed.

The seats 20 include the driver seat 21 on which a driver sits, the front passenger seat 22 on which a passenger sits and rear seats located in the rear side in the vehicle.

The cluster 30 may be implemented in a digital type. That is, the digital type cluster 30 displays vehicle information and driving state information as images.

The center fascia 35 is a portion of the dashboard 33 positioned between the driver seat 21 and the front passenger seat 22, and a vent and a cigarette lighter receptacle may be installed on the center fascia 35.

An audio-video-navigation (AVN) device 120 may be provided in the interior of the vehicle 1. The AVN device 120 refers to a terminal capable of providing integrated functions of audio and video in addition to providing a user with a navigation function which provides information about a route to a destination.

The AVN device 120 may selectively display at least one of an audio screen, a video screen, and a navigation screen through a display, and also display screens related to additional functions associated with control of the vehicle 1.

Meanwhile, the display may be positioned in the center fascia 35 which is the central region of the dashboard 33. According to some embodiments, the display 120 may be implemented by a liquid crystal display (LCD), a light emitting diode (LED) display, a plasma display panel (PDP), an organic light emitting diode (OLED) display, or a cathode ray tube (CRT) but the display 120 is not limited to these types.

The center console 37 may be provided with the center input 39 as the jog shuttle type or hard key type. The center input 39 may perform all or some of the functions of the AVN device 120.

Figure 3:
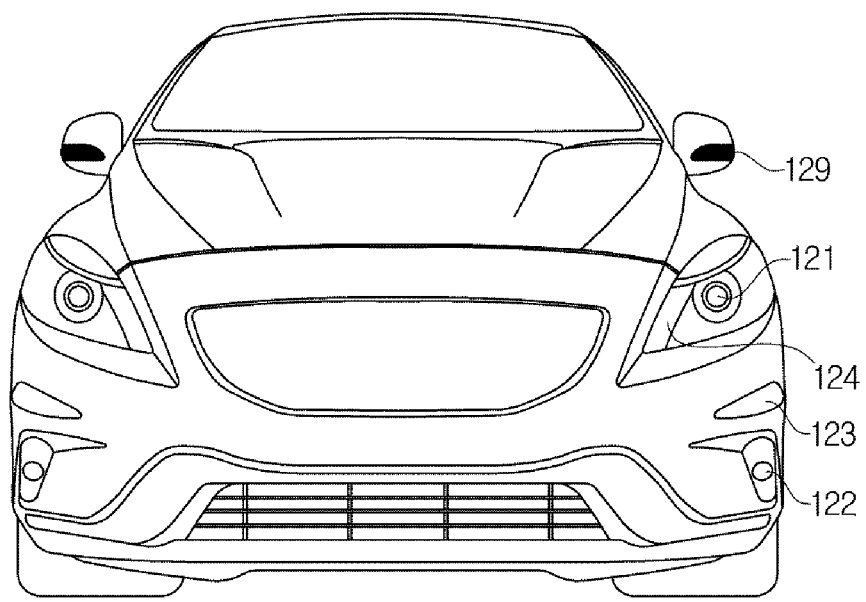
FIG. 3 is a front view of a vehicle according to exemplary embodiments of the present disclosure.

FIG. 3 is an example view of lamps at a front side of a vehicle exterior according to some exemplary embodiments.

As illustrated in FIG. 3, a plurality of lamps for lighting and indicating signals are provided at the front side of the vehicle exterior. As illustrated in FIG. 3, the plurality of lamps provided at the front side of the vehicle exterior include a head lamp 121 which illuminates a road, a fog lamp 122 which allows a driver to find a direction in foggy conditions by directing beams to face the road ahead and illuminate the shoulder, a side lamp 123 which indicates a boundary of a vehicle width, and a turn signal lamp 124 used when a vehicle changes a direction or for signaling the direction change.

Here, the head lamp 121 includes a high beam lamp which illuminates a long-distance road (roughly 100 m) ahead and a low beam lamp which illuminates a short-distance road (roughly 30 m) ahead.

Figure 4:
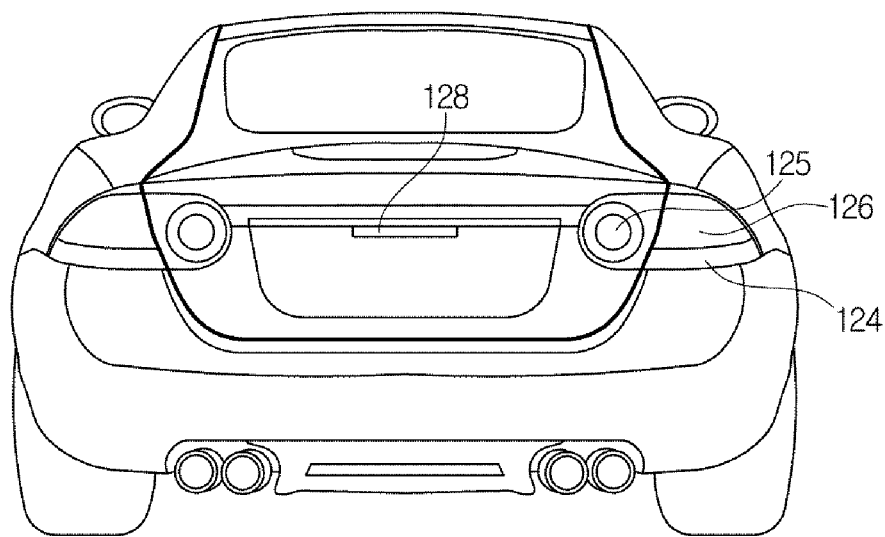
FIG. 4 is a rear view of a vehicle according to exemplary embodiments of the present disclosure.

FIG. 4 is an example view of lamps provided at a rear side of a vehicle exterior according to exemplary embodiments of the present disclosure.

Referring to FIG. 4, a plurality of lamps provided at the rear side of the vehicle exterior include a side lamp which indicates a boundary of a vehicle width, a turn signal lamp 124 used when a vehicle changes a direction or for signaling direction change, a tail lamp 125 that is automatically turned on when the head lamp 121 is turned on, a brake lamp 126 which warns a vehicle in the rear about braking when a driver presses the brake pedal, and a back-up lamp which warns a vehicle or pedestrian in the rear when the vehicle is reversing.

In addition, the rear side of the vehicle exterior may further include the brake lamp 126 disposed adjacent to a rear window glass and configured to warn a vehicle in the rear about braking when the driver presses the brake pedal, and a license plate lamp 128 which lights up the license plate of the vehicle. The front side of the vehicle exterior may further include auxiliary lamps 129 disposed at front surfaces of the side mirrors 11 and 12.

The auxiliary lamps 129 provided at the side mirrors 11 and 12 may be LEDs for indicating braking or a turning direction and there may be LEDs additionally provided at the side mirrors 11 and 12 for indicating boundaries of the vehicle width.

Here, each lamp may be disposed in a pair, one on the left and the other on the right, at the front side and rear side of the vehicle.

Figure 5:
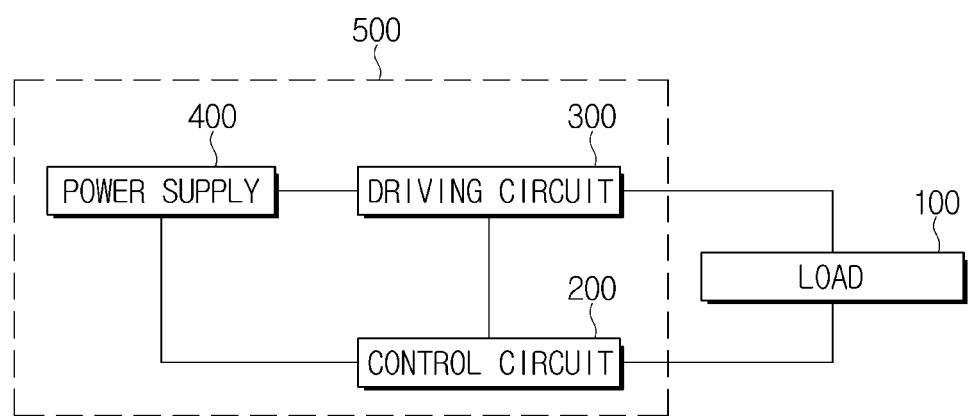
FIG. 5 is a control block diagram of a current control system according to exemplary embodiments of the present disclosure.

FIG. 5 is a control block diagram of a current control system according to exemplary embodiments of the present disclosure.

Referring to FIG. 5, an apparatus for controlling electric current 500 of the present disclosure may include a driving circuit 300, a power supply 400 and a control circuit 200.

The driving circuit 300 is an electronic component in which a plurality of elements are integrated in a single chip to process particular complex functions. The driving circuit 300 is configured with electronic circuits chiefly configured as semiconductors and a small package having multiple terminals. An individual element that is compared to the integrated circuit is referred to as an individual component, that is, a discrete component. To manufacture the driving circuit 300, layouts of fine elements, interconnections and the like on a thin semiconductor substrate called a wafer are repeatedly imaged using optical photography technologies, and operations of etching or depositing are repeated on the semiconductor substrate using the imaged layouts as a mask. Using the above-described methods, a plurality of identical circuits is manufactured on a single wafer at the same time. Each of the circuits on the wafer detached one by one before or after a testing is referred to as a die. A good-quality die is wired with outer side terminals and is packaged in a plastic, a ceramic or a metal can. Although the above-described process is for manufacturing a monolithic integrated circuit, a hybrid integrated circuit may include several passive components processed on a plurality of dice or a die packaged in a single package. Electronic circuits may be configured on a wafer using photography and doping technologies, in which the most easily integrated elements are a transistor, a diode and a resistor. A capacitor having a large capacity or a coil has a separate terminal to be connected to the outside to be a part of a circuit configuration. In digital circuits, integrated circuits are central to logical representations. The driving circuit 300 according to exemplary embodiments of the present disclosure may include a rectifying element having very large internal impedance (ideally, infinite) and be configured to supply a constant current to a load 100 regardless of the load 100, an output controller which accepts, stores and analyzes control commands and generates system control signals, a current adjuster, and a heat shielding element which protects the system from problems of overheating or fatigue caused by a combination of surrounding temperature, heat radiation and the like.

The control circuit 200 may include a diode, a resistor and a transistor, and may be electrically connected to the driving circuit 300 and configured to supply a constant current to the load 100. The control circuit 200 may include a metal-oxide semiconductor field-effect-transistor (MOSFET) 201 which is the most typical field-effect-transistor (FET) used in digital circuits and analog circuits and is configured with a channel of an n-type semiconductor material or p-type semiconductor material, and depending on the material. The MOSFET may be roughly classified as an NMOSFET, a PMOSFET or a complementary MOSFET (CMOSFET) which includes both of the materials. The MOSFET 201 may be configured with terminals of a gate, a source and a drain.

The MOSFET 201 may be classified as being in a cut-off state, a linear region, or a saturation region depending on voltage level applied between the gate and the source. The cut-off state represents a state in which a sufficient voltage is not applied and the MOSFET 201 does not operate, and the linear state represents a state in which the MOSFET 201 operates in proportion to an applied voltage. The saturation region represents a state in which a voltage of a certain level or higher is applied and is a state in which a constant voltage is transferred. In the present disclosure, the control circuit 200 may include the MOSFET 201. The driving circuit 300 is connected to the MOSFET 201, and the control circuit 200 is activated to operate when a voltage of a certain level or higher is applied to the MOSFET 201. In the present disclosure, the gate of the MOSFET 201 included in the control circuit 200 is connected to the driving circuit 300, and the source and the drain are connected to resistors in the control circuit 200. Details of this will be described below.

When a voltage of a certain level or higher is applied to the driving circuit 300, the control circuit 200 is activated to operate to consume a certain level of power, and thereby an excessively high voltage may be prevented from being applied to the driving circuit 300. Accordingly, even when an excessively high voltage is applied to the whole circuit, a constant current may be continuously supplied after passing through the driving circuit 300 and the control circuit 200. Operations of the control circuit 200 will be described in detail below.

The power supply 400 supplies energy to operate a circuit or device, and a type and form thereof may differ according to requirements of the load 100 such as a form of power, a voltage, a current, a power level, stability and the like.

The driving circuit 300 and the control circuit 200 which receive power from the power supply 400 may be electrically connected to the load 100.

The load 100 is not limited as long as it is a device using a current. Any component using a current in the components illustrated in FIGS. 1 to 4 may be the load 100. Particularly, the load 100 may be provided with an LED lighting device which generates light.

Figure 6:
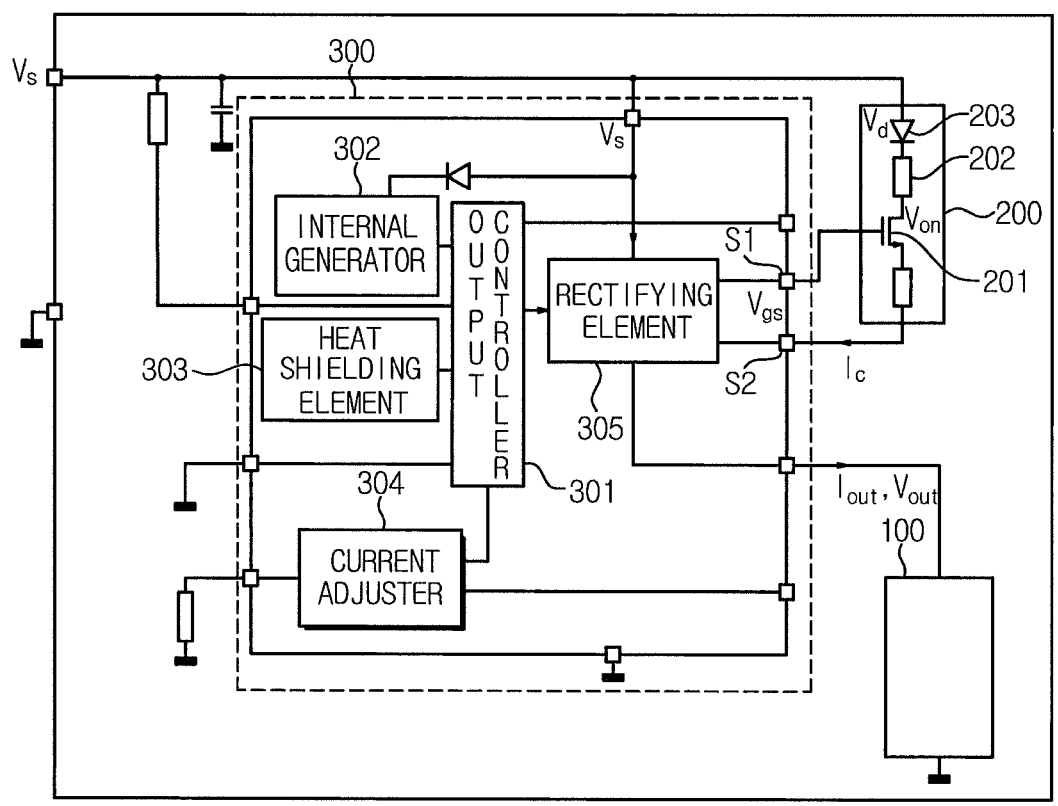
FIG. 6 is a circuit diagram according to exemplary embodiments of the present disclosure.

FIG. 6 represents a circuit diagram according to exemplary embodiments of the present disclosure.

Figure 7:
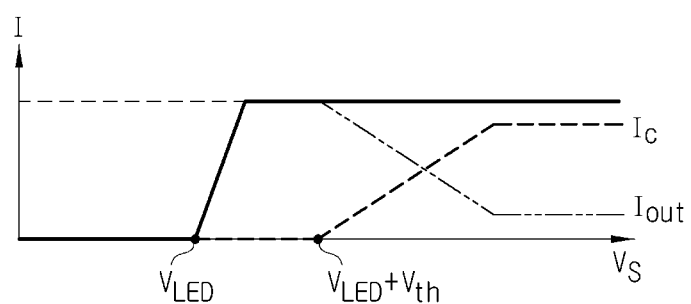
FIG. 7 is a graph showing a relationship between a voltage and a current according to exemplary embodiments of the present disclosure.

FIG. 7 represents a graph showing voltage and current characteristics according to embodiments of the present disclosure.

Referring to FIGS. 6 and 7, the driving circuit 300 may include an output controller 301, an internal generator 302, a heat shielding element 303, a current adjuster 304 and a rectifying element 305.

The output controller 301 may control a current amount transferred to the load 100 on the basis of power received from an external power supply. The output controller 301 may include a memory in which a program that performs operations described above and below and various data associated with the program are stored, a processor which executes the program stored in the memory, a micro control unit (MCU) and the like.

The internal generator 302 transfers power to the output controller 301 so that the output controller 301 may operate. The heat shielding element 303 serves the role of adjusting the output controller 301 in response to heat generated when power of a certain level or higher is supplied to the driving circuit 300. The rectifying element 305 serves the role of adjusting a current amount supplied through the driving circuit 300 to be constant.

An external voltage is applied to the driving circuit 300 and the control circuit 200. When only the driving circuit 300 is included and an excessively high voltage is applied to the circuit, the power supply is cut off by the heat shielding element 303. However, in the present disclosure, by electrically connecting the control circuit 200 to the driving circuit 300, the control circuit 200 is activated to operate when a voltage of a predetermined certain level or higher is applied. That is, in the case of conventional technology in which the control circuit 200 is not included, when a voltage applied to the driving circuit 300 is increased, the voltage is applied only to the driving circuit 300, a large current amount flows therein, heat is generated, and thereby the operation of the driving circuit 300 is stopped, while in the present disclosure, the control circuit 200 is activated to operate, a voltage is distributed to the control element according to a voltage division principle, and thereby the voltage applied to the driving circuit 300 may be reduced.

In the circuit diagram illustrated in FIG. 6, when a voltage $V_{gs}$ applied to the gate and the source of the MOSFET 201 embedded in the control circuit 200 is greater than a threshold voltage $V_{th}$ of the MOSFET 201, the control circuit 200 is activated to operate. The voltage $V_{gs}$ may be calculated on the basis of the voltage between S1 and S2. When the control circuit 200 is activated to operate, a second current $I_C$ is distributed to the control circuit 200 on the basis of a voltage applied to both ends of the control circuit 200 and a resistance in the control circuit 200. Meanwhile, a first current $I_{OUT}$ applied to the driving circuit 300 is reduced by the current distributed to the control circuit 200. When the first current applied to the driving circuit 300 is reduced, the total power applied to the driving circuit 300 is reduced, an amount of heat generated is also reduced, and thereby the driving circuit 300 may be operated even when a high voltage is applied.

On the other hand, as a total applied voltage $V_S$ grows higher, the current amount supplied to the load 100 through the control element increases and an amount of the first current supplied to the load 100 through the driving circuit 300 decreases. Based on the above-described operation, a constant current may be supplied to the load 100.

Referring to FIG. 7, FIG. 7 illustrates a graph in which the horizontal axis represents the total applied voltage and the vertical axis represents the current amount supplied to the load 100.

As illustrated in FIG. 7, since the driving circuit 300 also includes a nonlinear element such as a diode, the driving circuit 300 does not supply a current when a voltage $V_{LED}$ of less than a certain level is applied. When the voltage $V_{LED}$ of a certain level or higher is applied, the driving circuit 300 may supply a constant current to the load 100. As the voltage increases, an amount of the power applied to the driving circuit 300 is gradually increased, and a temperature of the driving circuit 300 increases. When a voltage greater than a summed voltage value of the voltage $V_{LED}$ at which the current starts to be supplied and the threshold voltage $V_{th}$ of the MOSFET 201 included in the control circuit 200 is applied, the operation of the control circuit 200 is activated, and the current is supplied through the control circuit 200 on the basis of the applied voltage. Since the current is distributed on the basis of the operation described above, the driving circuit 300 may continue to operate due to reduced heat generation. The variables illustrated in the graph of FIG. 7 are values that may be arbitrarily set by a user and may be changed according to types and characteristics of the load 100.

Figure 8:
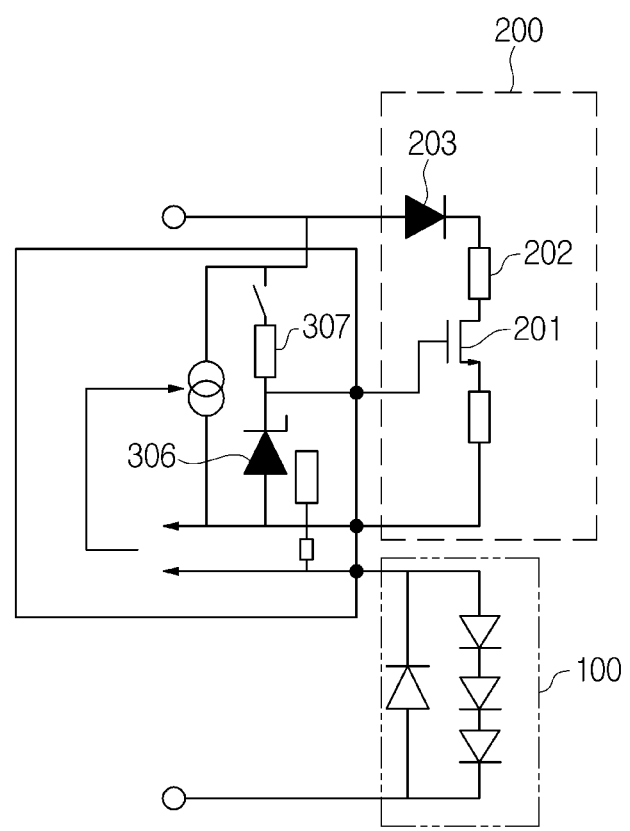
FIG. 8 is a circuit diagram according to exemplary embodiments of the present disclosure.

FIG. 8 is a circuit diagram according to exemplary embodiments of the present disclosure.

FIG. 8 is a circuit diagram which further details a portion of FIG. 6.

Referring to FIG. 8, FIG. 8 illustrates a Zener diode 306.

The Zener diode 306 exhibits the same characteristics as a normal diode when biased in a forward direction but permits current to flow in a reverse direction in a specific voltage less than a normal diode when a voltage is applied in a reverse direction. Since the normal diode does not allow current to flow when a voltage is applied in a reverse direction, the normal diode is used for a rectifier, detection or the like. However, when a PN junction diode is highly doped with impurities and a reverse voltage applied exceeds a certain voltage level called a Zener voltage or a breakdown voltage, a breakdown phenomenon occurs and the reverse current rapidly flows.

The Zener diode 306 is designed to greatly reduce the breakdown voltage for the purpose of obtaining a constant voltage and is often used to form a constant voltage source for stabilizing a voltage supplied to an electric circuit.

In the present disclosure, the Zener diode 306 may serve to fix the voltage between the gate and source of the MOSFET 201 embedded in the control circuit 200. The Zener diode 306 may allow current to flow in the reverse direction when a voltage of a certain level or higher is applied. Accordingly, when a voltage higher than a certain level is applied to the driving circuit 300, the voltage may also be applied to the MOSFET 201 inside the control circuit 200.

Meanwhile, a logic gate 307 positioned above the Zener diode 306 is the logic gate 307 included in the driving circuit 300 and is activated to operate when the supplied voltage exceeds a certain level enough to operate the control circuit 200.

The logic gate 307 obtains an output of a binary signal corresponding to an input given by a binary signal of 1 or 0 and is a basic circuit of an arithmetic operation device, a control device, etc. of a computer. As basic logic circuits, an AND circuit in which 1 is obtained as the output only when both inputs are 1, an OR circuit in which 1 is obtained as the output when either one of the two inputs is 1, a NOT circuit in which the logic state of the input and output is reversed, a NAND circuit in which 0 is obtained as the output only when both inputs are 1 when the AND circuit and the NOT circuit are connected, and the like may be provided.

Specifically, referring to FIG. 8, the control circuit 200 may adjust current and voltage values according to the type and application of the load 100. Meanwhile, power consumed by the control circuit 200 may be expressed by Equation 1 below.

$$P_d = (V_s - V_{out} - V_d - V_{on})^2 / R_1 + R_2 \quad \text{[Equation 1]}$$

Referring to Equation 1, $P_d$ represents the power consumed by the control circuit 200 and the voltage ($V_s - V_{out} - V_d - V_{on}$) expressed in the numerator represents the voltage applied to the control circuit 200. $R_1$ and $R_2$ represent resistances included in the control circuit 200. The resistor 202 may be connected to the drain and source of the MOSFET 201 included in the control circuit 200. The number, size and type of the resistor 202 connected to the drain and source of the MOSFET 201 are not limited. Specifically, $V_s$ represents a voltage applied and $V_{out}$ represents a voltage at an output terminal of the load 100. $V_d$ represents a voltage applied to the diode 203, and $V_{on}$ represents a voltage applied to the MOSFET 201.

The current amount supplied to the load 100 may be adjusted by adjusting the resistance value expressed in Equation 1. However, FIG. 7 and Equation 1 are merely examples of some embodiments of the present disclosure, and types, numbers, and positions of the current controlling elements are not limited thereto.

FIG. 9 is a flowchart for describing an operation of the present disclosure.

Referring to FIG. 9, a voltage is supplied to the whole circuit by the power supply 400 (601). When a voltage less than a predetermined voltage value is supplied, the current is supplied to the load 100 via the driving circuit 300 (606).

The supplied voltage may be increased and when a voltage higher than a voltage value predetermined by a user is supplied (602), the control circuit 200 is activated to operate (603). Since the control circuit 200 may include the MOSFET 201, the control circuit 200 may operate when a voltage higher than a certain value is applied. Since the operation related to the MOSFET 201 has been described above, a detailed description will be omitted.

When the control circuit 200 operates, the current is distributed to the driving circuit 300 and the control circuit 200 according to the current division principle (604). The current is transferred to the load 100 through the driving circuit 300 and the control circuit 200 (605).

When the current is distributed in the above manner, a small amount of current flows to the driving circuit 300 and thereby the amount of heat generated at the driving circuit 300 may be reduced. The current distributed to the driving circuit 300 and the control circuit 200 is supplied to the load 100 (605 and 606).

According to one aspect of the present disclosure, the apparatus for controlling electric current of a vehicle and a vehicle having the same can supply a constant current to the load by connecting the control circuit to the driving circuit without using an additional circuit and thereby reducing costs and simplifying the circuit configuration.

Disclosed embodiments have been described above with reference to the attached drawings. It should be understood by those skilled in the art that the present disclosure may be implemented in other forms different from the disclosed embodiments without modifying the technical spirit or essential features of the disclosure. Therefore, the above described embodiments should be considered in a descriptive sense only and not for the purpose of limitation.

What is claimed is:

1. An apparatus for controlling electric current, comprising:
    a power supply for supplying voltage;
    a driving circuit for receiving voltage from the power supply, and configured to supply a first current to a load electrically connected thereto; and
    a control circuit electrically connected to the load and the driving circuit, and configured to supply a second current to the load,
    wherein the driving circuit supplies the first current to the load based on a difference between a reference current and the second current,
    wherein the control circuit supplies the second current to the load based on a difference between the reference current and the first current when voltage equal to or higher than a first preset value is applied to the driving circuit,
    wherein the driving circuit supplies the first current to the load when voltage less than the first preset value is applied to the driving circuit, and
    wherein the driving circuit supplies the first current to the load when voltage equal to or higher than a second preset value is applied to the driving circuit.

2. The apparatus of claim 1, wherein the control circuit operates as an open circuit when voltage that is less than the first preset value is applied to the driving circuit.

3. The apparatus of claim 1, wherein the control circuit includes at least one transistor and at least one resistance element.

4. The apparatus of claim 1, wherein the control circuit includes at least one metal-oxide semiconductor field-effect-transistor (MOSFET) and at least one resistance element.

5. The apparatus of claim 1, wherein the control circuit includes a plurality of resistance elements individually connected in series to a drain and a source of a MOSFET.

6. The apparatus of claim 5, wherein the driving circuit includes at least one logic gate and at least one Zener diode.

7. The apparatus of claim 6, wherein the driving circuit includes the Zener diode electrically connected to a gate and the source of the MOSFET and the logic gate connected to the Zener diode in series.

8. A vehicle comprising:

a power supply for supplying voltage;

a driving circuit for receiving voltage from the power supply, and configured to supply a first current to a load electrically connected thereto; and a control circuit electrically connected to the load, electrically connected to the driving circuit, receiving voltage from the power supply, and configured to supply a second current to the load, wherein the driving circuit supplies the first current to the load based on a difference between a reference current and the second current, wherein the control circuit supplies the second current to the load based on the difference between the reference current and the first current when voltage equal to or higher than a first preset value is applied to the driving circuit, wherein the driving circuit supplies the first current to the load when voltage less than the first preset value is applied to the driving circuit, and wherein the driving circuit supplies the first current to the load when voltage equal to or higher than a second preset value is applied to the driving circuit.

9. The vehicle of claim 8, wherein the control circuit operates as an open circuit when voltage that is less than the first preset value is applied.

10. The vehicle of claim 8, wherein the control circuit includes at least one transistor and at least one resistance element.

11. The vehicle of claim 10, wherein the control circuit includes at least one MOSFET and at least one resistance element.

12. The vehicle of claim 11, wherein the control circuit includes a plurality of resistance elements individually connected in series to a drain and a source of the MOSFET.

13. The vehicle of claim 12, wherein the driving circuit includes at least one logic gate and at least one Zener diode.

14. The vehicle of claim 13, wherein the driving circuit includes the Zener diode electrically connected to a gate and the source of the MOSFET and the logic gate connected to the Zener diode in series.

* * * * *